United States Patent [19]

Frey

[11] Patent Number: 5,455,773

[45] Date of Patent: Oct. 3, 1995

[54] METHOD FOR THE DETERMINATION OF OPTIMUM PARAMETERS FOR A CASTING PROCESS, PARTICULARLY ON DIE-CASTING MACHINES

[75] Inventor: Rolf Frey, Winterbach, Germany

[73] Assignee: Maschinenfabrik Müller-Weingarten AG, Weingarten, Germany

[21] Appl. No.: 203,363

[22] Filed: Mar. 1, 1994

[30] Foreign Application Priority Data

Mar. 31, 1993 [DE] Germany ............... 43 10 332.4

[51] Int. Cl.[6] ............... G06F 15/00; B22D 46/00
[52] U.S. Cl. ............... 364/476; 164/4.1; 364/552
[58] Field of Search ............... 364/149, 150, 364/476, 578, 550, 551.01, 552; 164/4.1

[56] References Cited

U.S. PATENT DOCUMENTS

| | | | |
|---|---|---|---|
| 4,493,362 | 1/1985 | Moore et al. | 364/476 |
| 4,504,920 | 3/1985 | Mickowski | 364/550 |
| 4,558,421 | 12/1985 | Shriver | 364/477 |
| 4,734,869 | 3/1988 | Mickowski | 364/550 |
| 5,202,837 | 4/1993 | Coe et al. | 364/578 |
| 5,736,497 | 8/1992 | Coe et al. | 364/578 |

FOREIGN PATENT DOCUMENTS

| | | |
|---|---|---|
| 0126722 | 11/1984 | European Pat. Off. . |
| 0126174 | 11/1984 | European Pat. Off. . |
| 481413 | 4/1992 | European Pat. Off. . |
| 3111425 | 2/1982 | Germany . |
| 3622822 | 1/1987 | Germany . |

Primary Examiner—Paul P. Gordon
Attorney, Agent, or Firm—Spencer, Frank & Schneider

[57] ABSTRACT

A computer implemented method for determining optimized parameter values for a casting process for use with a diecasting machine, including: storing a plurality of known data sets of individual parameters of a casting cycle for a casting process for an optimization program in a die data memory of a die-casting machine control system; transferring automatically each data set of the plurality of known data sets in succession to the die-casting machine control from the die data memory by means of the optimization program, without external manual intervention, and running a preselected number of casting test cycles with each successive data set; testing sample products produced with one data set in the casting test cycles for quality by metallurgical means to provide at least one measured value; assessing quality of the sample products produced with one data set in the casting test cycles employing an automatic quality control operation to identify optimum parameter data sets from the at least one measured value; and using optimum parameter data sets for one series of measured values for the subsequent production of series-produced parts.

8 Claims, 6 Drawing Sheets

FIG. 1

| | | | |
|---|---|---|---|
| | $a_2)$ OPTIMIZATION PROGRAM | $D_1:$ | $a_1)$ |
| a | NO. [1] CASTING CYCLE [1] - [10] | $P_1$ SPEED PHASE 1 [20] %<br>$P_2$ SPEED PHASE 2 [20] %<br>$P_3$ SPEED PHASE 3 [10] %<br>$P_4$ INITIATION POSITION PHASE 2 [350] mm<br>$P_5$ INITIATION POSITION PHASE 3 [400] mm<br>$P_6$ RAMP TIME [1.5] s<br>$P_7$ ACCUMULATOR PRESSURE 3RD PHASE [120] bar | |
| | $b_2)$ OPTIMIZATION PROGRAM | $D_2:$ | $b_1)$ |
| b | NO. [2] CASTING CYCLE [11] - [20] | $P_1$ SPEED PHASE 1 [ ] %<br>$P_2$ SPEED PHASE 2 [ ] %<br>$P_3$ SPEED PHASE 3 [ ] %<br>$P_4$ INITIATION POSITION PHASE 2 [ ] mm<br>$P_5$ INITIATION POSITION PHASE 3 [ ] mm<br>$P_6$ RAMP TIME [ ] s<br>$P_7$ ACCUMULATOR PRESSURE 3RD PHASE [ ] bar | |
| | $c_2)$ OPTIMIZATION PROGRAM | $D_3:$ | $c_1)$ |
| c | NO. [3] CASTING CYCLE [21] - [30] | $P_1$ SPEED PHASE 1 [ ] %<br>$P_2$ SPEED PHASE 2 [ ] %<br>$P_3$ SPEED PHASE 3 [ ] %<br>$P_4$ INITIATION POSITION PHASE 2 [ ] mm<br>$P_5$ INITIATION POSITION PHASE 3 [ ] mm<br>$P_6$ RAMP TIME [ ] s<br>$P_7$ ACCUMULATOR PRESSURE 3RD PHASE [ ] bar | |
| n | $n_2)$ e.g. n = 1-10 | $D_n:$ | $n_1)$ |

DIE DATA MEMORY WITH INPUT OF THE CASTING PARAMETERS

☐ = INPUT DATA

| OPTIMIZATION PROGRAM | $P_1$ SPEED PHASE 1 | $P_2$ SPEED PHASE 2 | $P_4$ INITIATION POSITION 2ND PHASE |
|---|---|---|---|
| 1 | $P_{11}$ = 20% | $P_{21}$ = 20% | $P_{41}$ = 350mm |
| 2 | $P_{12}$ = 60% | $P_{21}$ = 20% | $P_{41}$ = 350mm |
| 3 | 20% | 40% | 350mm |
| 4 | 60% | 40% | 350mm |
| 5 | 20% | 20% | 450mm |
| 6 | 60% | 20% | 450mm |
| 7 | 20% | 40% | 450mm |
| 8 | 60% | 40% | 450mm |

FIG. 4

| | | |
|---|---|---|
| | DIE DATA MEMORY WITH AUTOMATIC COMBINATION OF THE PARAMETERS | |
| a | OPTIMIZATION PROGRAM  $a_2$) <br><br> NO. $\boxed{1}$ <br><br> CASTING CYCLE <br><br> $\boxed{1}$ - $\boxed{10}$ | $a_1$) <br> $P_1$ SPEED  PHASE 1: <br>   MIN: $\boxed{20}$ % = $P_{11}$     $P_{11}$ ACT.: 20% <br>   MAX: $\boxed{60}$ % = $P_{12}$ <br><br> $P_2$ SPEED  PHASE 2: <br>   MIN: $\boxed{20}$ % = $P_{21}$     $P_{21}$ ACT.: 20% <br>   MAX: $\boxed{40}$ % = $P_{22}$ <br><br> $P_4$ INITIATION POSITION  2ND PHASE: <br>   MIN: $\boxed{350}$ mm = $P_{41}$     $P_{41}$ ACT.: 350mm <br>   MAX: $\boxed{450}$ mm = $P_{42}$ |
| b | OPTIMIZATION PROGRAM  $b_2$) <br><br> NO. $\boxed{2}$ <br><br> CASTING CYCLE <br><br> $\boxed{11}$ - $\boxed{20}$ | $b_1$) <br> SPEED  PHASE 1:       ACT.: 60% <br> SPEED  PHASE 2:       ACT.: 20% <br> INITIATION POSN. 2ND PHASE  ACT.: 350mm |
| c | OPTIMIZATION PROGRAM  $c_2$) <br><br> NO. $\boxed{3}$ <br><br> CASTING CYCLE <br><br> $\boxed{21}$ - $\boxed{30}$ | $c_1$) <br> SPEED  PHASE 1:       ACT.: 20% <br> SPEED  PHASE 2:       ACT.: 40% <br> INITIATION POSN. 2ND PHASE  ACT.: 350mm |
| d | OPTIMIZATION PROGRAM  $d_2$) <br><br> NO. $\boxed{4}$ <br><br> CASTING CYCLE <br><br> $\boxed{31}$ - $\boxed{40}$ | $d_1$) <br> SPEED  PHASE 1:       ACT.: 60% <br> SPEED  PHASE 2:       ACT.: 40% <br> INITIATION POSN. 2ND PHASE  ACT.: 350mm |
| n | $n_2$) <br> e.g. n = 1-10 | $n_1$) <br> $\boxed{\phantom{xx}}$ = INPUT DATA |

FIG. 5

| PARAMETER SET | SPEED PHASE 1 | SPEED PHASE 2 | INITIATION POSN. 2ND PHASE | ASSESSMENT | | AVERAGE | | SHOT NO. |
|---|---|---|---|---|---|---|---|---|
| | | | | A | B | $A_m$ | $B_m$ | |
| a | 1 | $P_{11}$ 20% | $P_{21}$ 20% | $P_{41}$ 350mm | 2 | 3 | 2.8 | 3.0 | 1 |
| | | | | | 2 | 3 | | | 2 |
| | | | | | 2 | 4 | | | 3 |
| | | | | | 3 | 4 | | | 4 |
| | | | | | 4 | 4 | | | 5 |
| | | | | | 4 | 2 | | | 6 |
| | | | | | 4 | 3 | | | 7 |
| | | | | | 3 | 3 | | | 8 |
| | | | | | 3 | 2 | | | 9 |
| | | | | | 1 | 2 | | | 10 |
| b | 2 | $P_{12}$ 60% | $P_{21}$ 20% | $P_{41}$ 350mm | 5 | 3 | 5.2 | 2.7 | 11 |
| | | | | | 6 | 3 | | | 12 |
| | | | | | 6 | 3 | | | 13 |
| | | | | | 5 | 2 | | | 14 |
| | | | | | 4 | 4 | | | 15 |
| | | | | | 4 | 3 | | | 16 |
| | | | | | 5 | 3 | | | 17 |
| | | | | | 6 | 2 | | | 18 |
| | | | | | 6 | 2 | | | 19 |
| | | | | | 5 | 2 | | | 20 |
| c | 3 | $P_{11}$ 20% | $P_{22}$ 40% | $P_{41}$ 350mm | 8 | 6 | 7.7 | 6.5 | 21 |
| | | | | | 7 | 6 | | | 22 |
| | | | | | 8 | 7 | | | 23 |
| | | | | | 9 | 7 | | | 24 |
| | | | | | 6 | 7 | | | 25 |
| | | | | | 7 | 8 | | | 26 |
| | | | | | 7 | 5 | | | 27 |
| | | | | | 8 | 6 | | | 28 |
| | | | | | 8 | 6 | | | 29 |
| | | | | | 9 | 7 | | | 30 |
| d | 4 | $P_{12}$ 60% | $P_{22}$ 40% | $P_{41}$ 350mm | 4 | 2 | 3.3 | 2.6 | 31 |
| | | | | | 3 | 2 | | | 32 |
| | | | | | 3 | 3 | | | 33 |
| | | | | | 3 | 4 | | | 34 |
| | | | | | 4 | 1 | | | 35 |
| | | | | | 5 | 1 | | | 36 |
| | | | | | 3 | 3 | | | 37 |
| | | | | | 3 | 3 | | | 38 |
| | | | | | 2 | 3 | | | 39 |
| | | | | | 3 | 4 | | | 40 |

METHOD FOR THE DETERMINATION OF OPTIMUM PARAMETERS FOR A CASTING PROCESS, PARTICULARLY ON DIE-CASTING MACHINES

BACKGROUND OF THE INVENTION

1. Field of the Invention

The invention relates to a method for the determination of optimum parameters for a casting process, particularly on die-casting machines or the like, known data sets of individual parameters of a casting cycle being available.

2. Description of the Related Art

Automatic monitoring of the casting process during die-casting is known from the literature reference Gieβerei 68 (1981) No. 18, Page 531 ff.) and this system employs the fundamental method of die-casting control. Hitherto known monitoring systems for casting processes are based on a comparison of measured actual values for a very wide variety of parameters with predetermined desired values while the casting process is running and on the performance, if required, of corrections in the same or the subsequent casting cycle in order to match the actual value curve, for example, to the desired value curve.

In another method, described in DE 31 11 425 C2, a plurality of successive values for a particular operating parameter are stored in a first learning phase during an operating sequence of a machine tool and, taking account of permissible tolerance deviations, these values are used in the formation of limiting values. In a subsequent monitoring phase, it is determined whether the values for this operating parameter which then occur undershoot or exceed these limiting values. In the formation of the limiting value for the monitoring phase, use is made either of the maximum value or the minimum value or of an average value for the values stored in the learning phase. The aim of this known teaching is to shut down a machine tool if, during the operation of the machine, an operating parameter exceeds or undershoots the limiting value determined in this way.

In the control of machines and, in particular, die-casting machines, the recording and storage of process parameters and the formation of reference values with tolerance intervals is accordingly known. Thus, for example, DE 36 22 822 C2 describes a method for the control of a machine with corresponding control values, the operating conditions of the machine being recorded, control parameters stored and the control values using which the machine is controlled determined on the basis of the operating conditions recorded.

In practice, wide-ranging tests are carried out to allow the interdependence of a plurality of parameters, the settings of which have an effect in the operation of a production plant on the quality of an end product, to be mastered in terms of control. Particularly in the case of die casting, there is an extremely large number of such parameters, such as, for example, the melting temperature, the metered quantity, the acceleration or speed during the various phases of the casting process, the force applied to the casting plunger rod, the position of the changeover point between the individual phases, the accumulator pressure at the beginning of the second phase, the position of the plunger at the changeover point, the die temperatures, the ejector force, the lubricant quantity per nozzle, the injection times, the composition of the melt, etc. Some of these parameters are also mentioned in the publication "Gieβerei . . ." mentioned at the outset.

The correlations between such variables themselves and between them and the quality of the parts produced are so complex that an undesirably high proportion of reject parts may be produced even in the most modern plants.

In another known method for monitoring injection molding processes in the production of plastic parts in accordance with EP 0 126 722 B1, parameter values in the production process are used as reference data for the formation of a reference curve shape for those products produced which are defined as molded articles of a quality which is still good. In this method too the measured actual data are then compared in subsequent series production with the predetermined reference data of the parameter value, tolerance limits determining the permissible deviations.

SUMMARY OF THE INVENTION

The interactions between the individual casting parameters are thus known. In order to obtain a satisfactory die-casting result a comprehensive experimentation phase is nevertheless still carried out first of all when running in a new die-casting die, so as to obtain usable setting and reference values for subsequent series production. This experimentation phase is performed by manual input of a larger number of different parameters, i.e. the actual process of series production is preceded by trial production with various manually input data or data sets of parameters.

The object on which the invention is based is to propose optimization of the production process especially of die-Cast articles and, in particular, to eliminate the laborious manual inputting of casting parameters into the die data memory for the determination of usable reference data and to allow the execution of the various parameter sets on the machine to be performed automatically.

This object is achieved on the basis of a method Advantageous and expedient further developments of the method for the determination of optimized parameter values for a casting process, particularly on die-casting machines or the like, known data sets of individual parameters of a casting cycle being available, wherein various data sets for an optimization program are stored in a die data memory of the casting-machine control system and wherein each data set in succession is transferred automatically to the machine control system from the data memory by means of this optimization program, without external manual intervention, and a predetermined number of casting testing cycles are run with this data set, wherein the products produced with one data set in the test cycles are tested for quality by metallurgical means and assessed in an automatic quality control operation and wherein optimum parameter data sets for one series of measured values are used for the subsequent production of series-produced parts include setting the parameter data sets ($D_1$ to $D_n$) so that each have a predetermined number of individual parameters ($p_1$ to $P_7$), which are each executed for a certain predetermined number of casting cycles in one program step (1 to n) of the optimization program.

Further, the data sets ($D_1$ to $D_n$) executed by means of the optimization program lead to sample products which, within a program run with a certain data set, are evaluated according to predetermined physical assessment criteria (A, B) using known measuring methods and the averages ($A_m$, $B_m$) determined in each program step with a particular data set give an indication of the level of product quality obtained with this data set.

The analysis of the products produced with a respective data set may be performed by a known method of recording measured values for physical properties of the product and the quality of the measured values then leads to a mark, the average of which is for each physical assessment criterion is determined for each data set.

Various influencing variables, such as, for example, the speed in Phase 1, the speed in Phase 2, the initiation position in Phase 2 or the like are available in different, graduated values which may be in each case combined automatically in all combinations by the computer to give a particular parameter data set and wherein the optimization program executes each of these combined parameter data sets successively in a program step to determine optimum values without interrupting the casting process at the die-casting machine or the like.

The physical assessment criteria (A, B) may be assessed on a different scale of assessment, depending on the weighting of the individual parameter, parameters with a more significant effect being given a higher weighting and parameters with a less significant effect being given a lower weighting.

Quality control of the sample parts produced may be performed by means of an automatic measuring arrangement for predetermined measured values such as shrinkage cavity formation, surface finish, fracture tests, etc.

After automatic evaluation of the results of measurement for the sample castings, quality-relevant tolerance zones for the casting parameters may then be defined.

To allow optimized casting parameters to be found in a selected manner, it is thus proposed that the setting of the casting parameters on the casting machine be carried out automatically by means of an optimization program. In this, predetermined parameter data sets are executed automatically by means of an optimization program on the machine, thus eliminating a manual experimentation phase when running in a new casting die. Systematic execution of the data sets by means of a logical optimization program has the advantage that it is possible to find optimum data sets for better casting results in a shorter time. This makes possible a reduction in the reject rate during subsequent series production due to better setting of the machine. A more precise knowledge of the machine-dependent casting parameters in relation to a particular cast part can furthermore be obtained. This gives the possibility of determining appropriate tolerance limits of the casting parameters.

By virtue of the method according to the invention, the machine operator no longer has any influence on the preproduction phase since this is carried out by the optimization program itself. In this, the optimization program operates according to technological criteria, i.e. technically reasonable parameter data sets are input and systematically executed. At the same time, the number of casting cycles with respectively constant casting-parameter data sets in such an optimization program is preselectable. The number of combinations of casting parameters can also be preselected, the number of combinations of casting parameters being determined automatically in accordance with a defined trial procedure. Finally, automatic evaluation of the optimization program is performed by assessment of the component-specific quality features according to particular quality criteria in order to obtain optimum casting-parameter data sets for subsequent series production.

The system on which the optimization program is based also ensures parameter combinations which are not readily apparent when setting manually and which nevertheless produce surprising positive results.

Thus the fundamental idea underlying the invention is that one or more particular data sets must be found to define parts of good quality. A multiplicity of possible data sets for the achievement of optimized casting parameters are stored in the die data memory of the casting-machine control system and are subsequently transferred to an application memory of the machine control system. Input of the data can preferably be performed by means of a video screen or data carriers. Using the predetermined die data set, the optimization program then executes a certain number of casting cycles, the die data sets being transferred automatically from the die data memory into an application memory of the machine control system in accordance with the current casting cycle number. Changing casting-parameter data sets are thereby set automatically in accordance with a predetermined optimization program on the machine and assigned to a certain predetermined number of casting cycles and executed. It is thereby possible to define the test program systematically in a readily comprehensible way.

A further special feature of the invention lies in the automatic selection of individual casting parameters to give a data set and the possibility of a combination of these parameters. Here, particular casting parameters within predetermined minimum and/or maximum limits are to be assembled automatically into a systematic test program. The maximum possible combinations of casting parameters are then written automatically into the die data memory of a machine. The control system calculates the necessary number of optimization program runs and stores this in the die data memory. This ensures that all possible combinations of the casting parameters can be executed with a small outlay in terms of inputs. The machine then executes the individual runs for the combined data sets by means of the optimization program.

The invention furthermore envisages that the evaluation of the executed test series from the optimization program be performed in a quality control step. The evaluation of the results can be performed by means of known methods of measurement. This gives information which provides optimum parameter combinations for the production of parts of good quality with equal or different weighting of different parameters. It is a simple matter to determine which of the casting parameters tested has a significant influence on the quality of the cast part and it is possible to determine the magnitude of this influence. Determination of reasonable tolerances for the parameters can furthermore be performed. It is advantageous here that it is possible without problems to determine the percentage share of the tested casting parameters in the quality of the die-cast part.

In so far as the combination of the various casting parameters results in no significant change in the quality of the die-cast part, this fact can be used to determine changes to the die in terms of its casting characteristics or, for example, to change the thermal balance of the die.

BRIEF DESCRIPTION OF THE FIGURES

Further details and advantages of the invention are explained by means of the following drawings and diagrams in conjunction with the description of illustrative embodiments.

In the drawing.

DESCRIPTION OF THE PREFERRED EMBODIMENTS

The invention is described below with reference is application to a die-casting machine.

Figure 1:
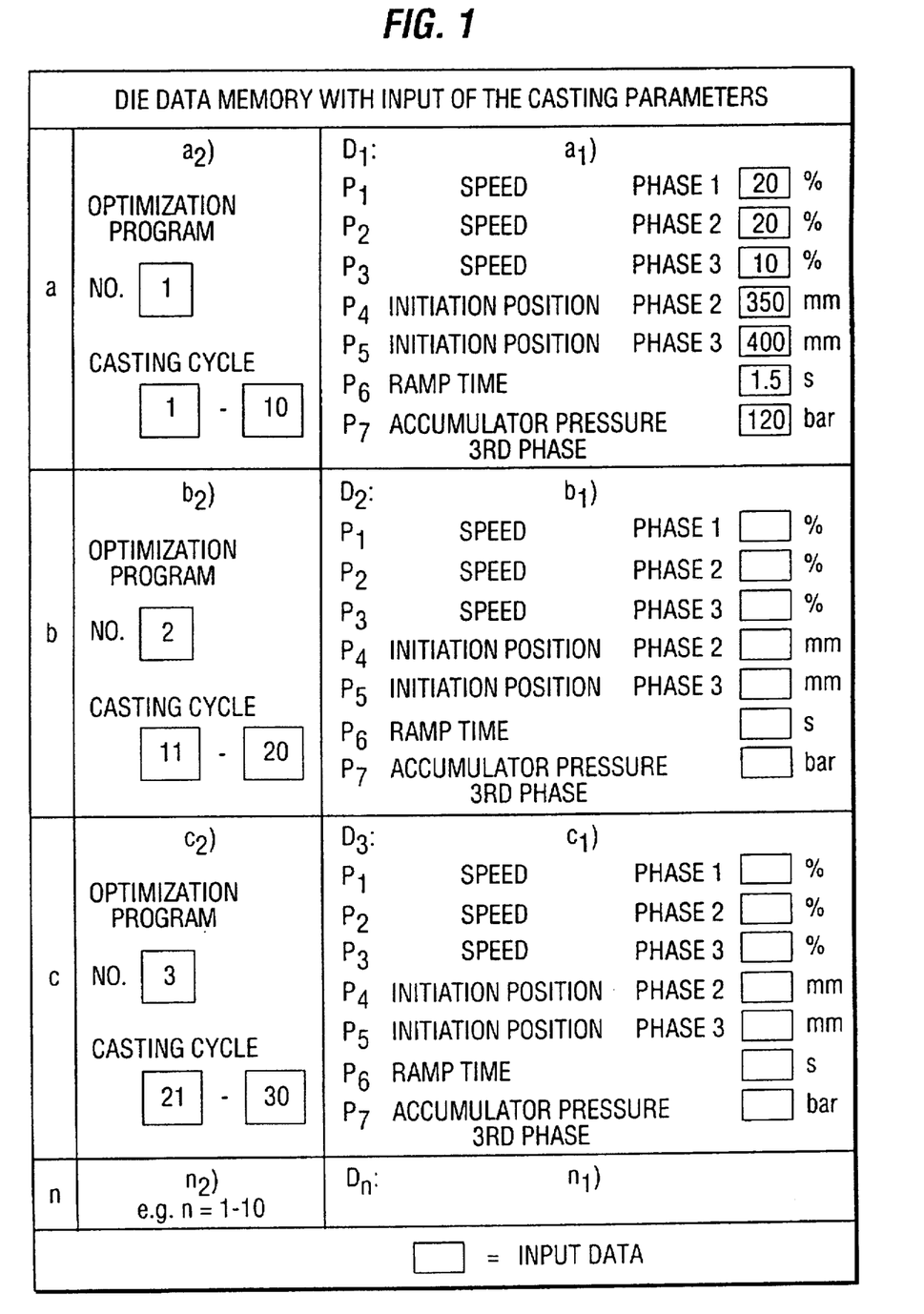
FIG. 1 shows a schematically represented die data memory for the input of casting-parameter data sets and the systematic independent execution of the optimization program for the determination of optimum values.

FIG. 1 shows a method for the determination of optimum data sets of casting parameters by means of a systematic series of tests carried out by means of an optimization program. In the right-hand column $a_1$, the topmost block a shows a first data set $D_1$ which consists, for example, of seven individual parameters $p_1$ to $P_7$. Individual parameter $p_1$, for example, relates to the speed of the first phase (creep feed) of the casting plunger, which should, for example, be 20% of the maximum casting plunger speed. Instead of a percentage value, it is also possible for an absolute value for the speed to be input. The next parameter value $p_2$ shown is the speed of the casting plunger in the second phase (die-filling stroke), and parameter $p_3$ indicates the speed in the third, i.e. squeezing, phase performed by means of a multiplier. In FIG. 1, further known parameters $p_4$ to $p_7$ are given by way of example. The boxes on the right each signify predetermined input data for this first data set $D_1$.

In conventional die-casting methods, testing to find optimum parameter sets is carried out by performing a given number of casting cycles with such a data set $D_1$. The machine is then switched off and the components are subjected to a manual inspection to determine whether they are acceptable or unacceptable. In a subsequent, second operation, a new data set $D_2$ containing the individual parameters $p_1$ to $p_n$, as shown, for example, in the right-hand column of block b, is used. The die-casting machine is then started up again using this manually input second data set and a certain number of casting cycles are performed, after which the machine is switched off again to check the individual parts and is reset. This process is repeated with data sets up to data set $D_n$. Between each of the individual test runs, i.e. between blocks a to n shown in FIG. 1, the machine is switched off and the casting cycle interrupted until resetting operations have been performed on the machine. However, this stoppage of the machine leads to a change in the machine parameters, such as, for example, die temperature, metal temperature, etc., and, as a result, the measurement results may thereby be falsified.

Figure 2:
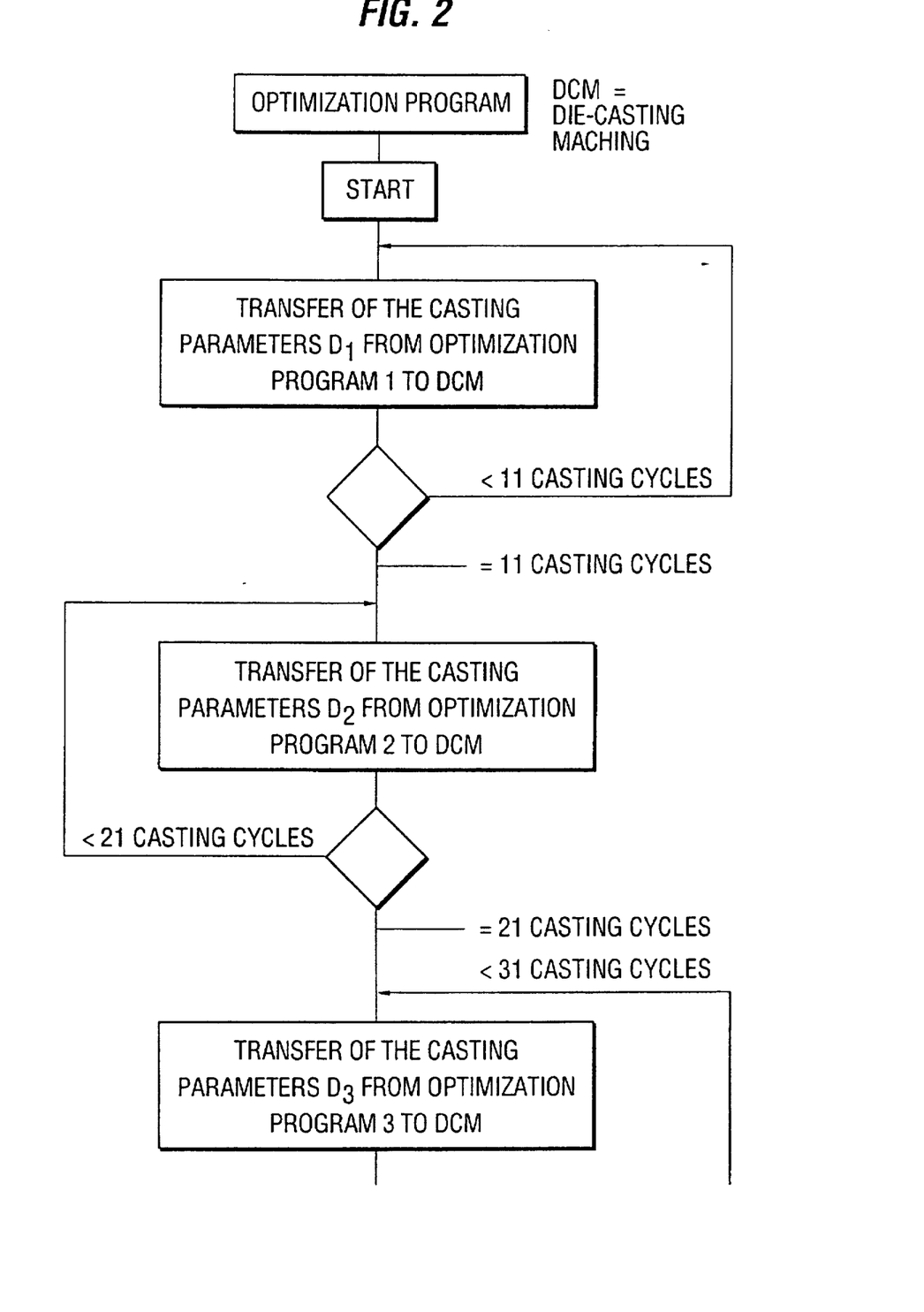
FIG. 2 shows a flow chart of the execution of the optimization program shown in FIG. 1.

Accordingly, the determination of optimum casting parameters according to the present invention takes place automatically by means of an optimization program as shown in FIG. 1 and the associated flow chart according to FIG. 2. The data sets $D_1$ to $D_n$ shown in the right-hand blocks $a_1$ to $n_1$ are input into the die data memory as previously prepared data sets, by means of a diskette, for example, or some other data carrier. In accordance with the left-hand column $a_2$ of block a in FIG. 1, the optimization program transfers the first data set $D_1$ containing the individual parameters $p_1$ to $P_7$ from the die data memory to an application memory of the machine control system and, for example, runs through casting cycles 1 to 10. Then without a stoppage of the machine, the optimization program replaces data set $D_1$ with data set $D_2$ from block b, comprising different parameter values $p_1$ to $p_7$. The optimization program then runs casting cycles 11 to 20 in program run 2, as indicated in the left-hand column $b_2$ in FIG. 1.

Without further stoppage of the machine, data set $D_2$ is then replaced with data set $D_3$ in block $c_1$, the latter again containing modified individual parameters $p_1$ to $p_7$ and program run 3 containing casting cycles 21 to 30 in accordance with block $c_2$ in FIG. 1 is executed. This automatic change of the particular data set is continued up to data set D. in accordance with $n_1$ in FIG. 1 and the optimization program again runs through the predetermined number of casting cycles. According to the illustration in block $n_2$, this process can, for example, comprise 10 program steps.

The execution of the optimization program according to FIG. 1 is shown again in FIG. 2, in a flow chart. After the starting of the die-casting machine DGM, the first casting-parameter data set $D_1$ is transferred from the die data memory and, with optimization program step 1, operates the die-casting machine in a first casting cycle. According to the flow chart, this process is repeated in a first loop until 10 casting cycles have been completed.

When 10 casting cycles have been completed, the optimization program automatically fetches the second casting-parameter data set $D_2$ from the die data memory in optimization program step 2 and, using this parameter set $D_2$, runs through the additional casting cycles 11 to 20. This is represented in FIG. 2 by the second loop.

The process is automatically continued, by automatic accessing of the subsequent casting-parameter data sets $D_3$ to $D_n$, with execution of optimization program steps 3 to n.

This automatic process of executing a particular number of casting cycles with a fixed predetermined parameter set without switching off the die-casting machine by means of the optimization program, it is possible to eliminate changes in the peripheral casting parameters and the program thus corresponds to the actual conditions of series production.

Figure 3:
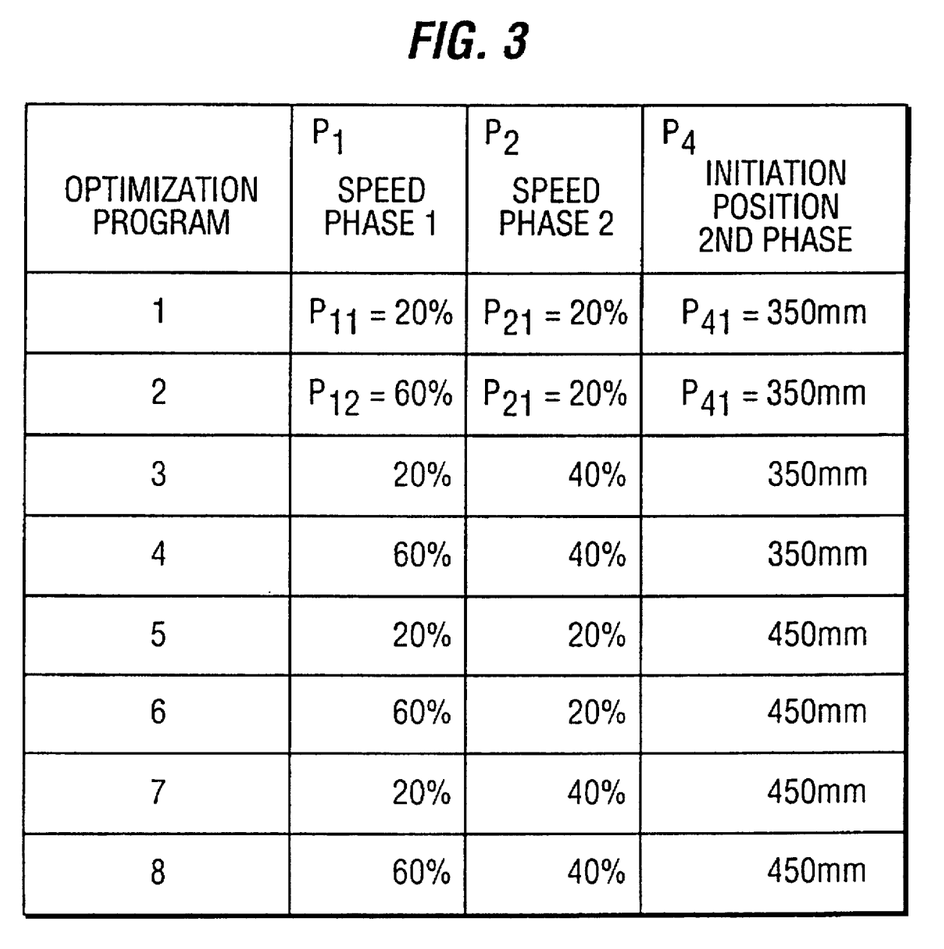
FIG. 3 shows a further illustrative embodiment relating to the selection of possible combinations of individual parameters to form a data set.
Figure 4:
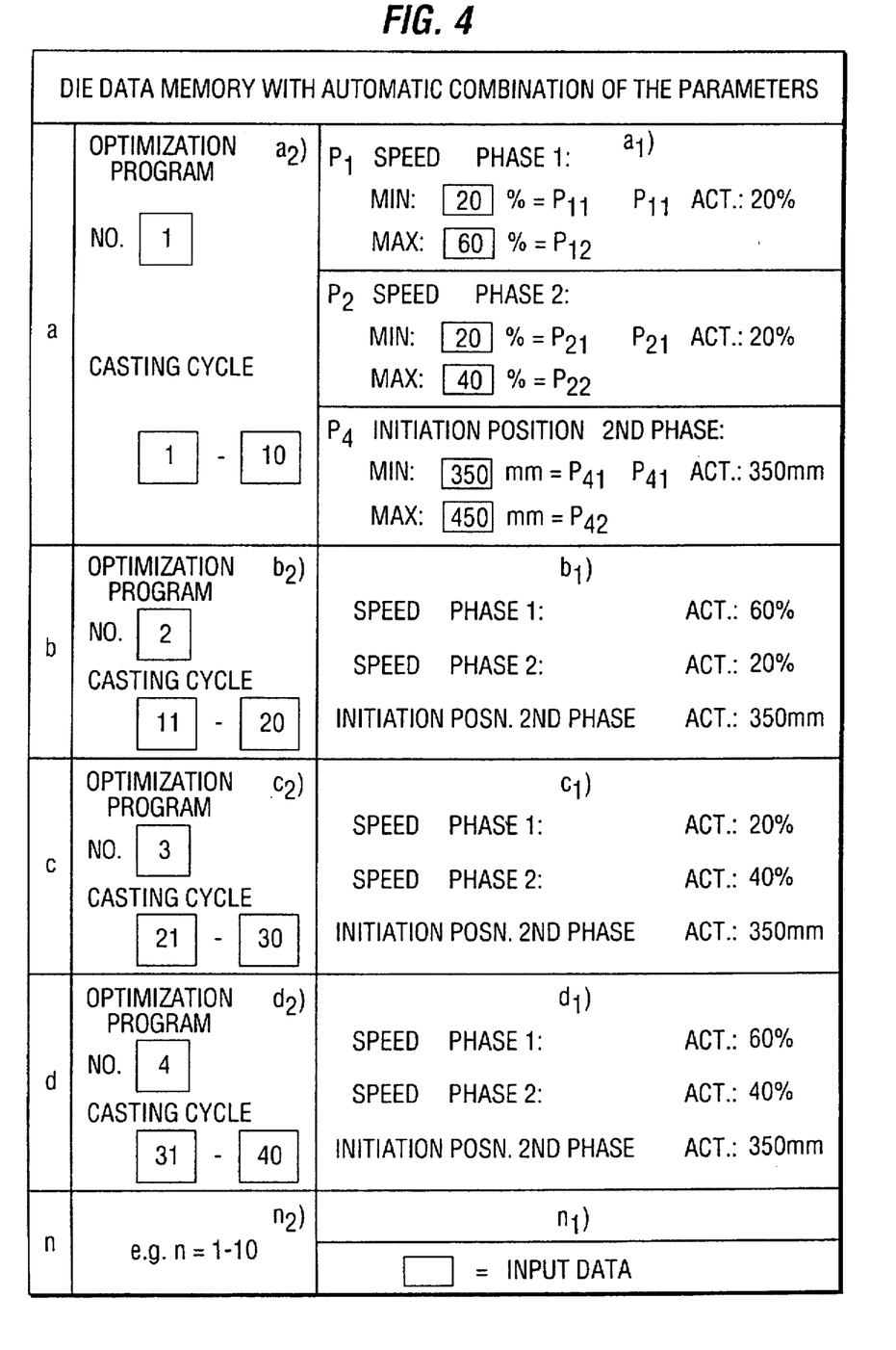
FIG. 4 shows a die data memory with automatic combination of the parameter data sets shown in FIG. 3.

The illustrations in FIGS. 3 and 4 show a variation in the use of the optimization program in that a certain combination of selected parameters is executed automatically in successive optimization program steps. Whereas, in the illustration according to FIGS. 1 and 2, parameter data sets $D_1$ to $D_n$ are specified and the individual, predetermined number of casting cycles are executed automatically in succession, in the embodiment of the invention according to FIGS. 3 and 4 certain individual parameters are executed in various combinations with one another.

As parameter $p_1$, the speed of phase 1 is, for example, set to the values $p_{11}=20\%$ and $p_{12}=60\%$ in order, for example, to ascertain the minimum and maximum influence of speed phase 1. Likewise, parameter value $p_2$ can be set to the values $p_{21}=20\%$ and $p_2=40\%$ of the respective minimum and maximum casting plunger speed. It is, of course, also possible to select any desired value in between. The position of initiation of the shot during the second phase of the casting process is given in FIG. 1 by the parameter $p_4$. If this individual parameter $p_4$ is selected in the illustrative embodiment according to FIGS. 3 and 4, this value is varied between the individual value $p_{41}=350$ mm and $p_{42}=450$ mm as representing the position of the casting plunger in the second die-casting phase.

According to the right-hand column $a_1$ of the upper block a in the illustration in FIG. 4, these two preselected values, for example, of the individual parameter $p_1$, $p_2$, $p_4$ are accordingly input into the die data memory, the optimization programs electing a certain combination of these values as actual values. According to the illustration in FIG. 3, this is, for example, a first program step 1 of the optimization program using the actual values $p_{11}=20\%$, $p_{21}=20\%$ and $p_4=350$ mm, as also shown in the right-hand column $a_1$ of the upper block a in FIG. 4. According to the illustration in the left-hand column $a_2$ of block a in FIG. 4, the optimization program executes casting cycles 1 to 10 with the predetermined parameter data sets $p_{11}$, $p_{21}$, $p_{41}$ in the first program step 1. The optimization program then changes the combination of input data automatically, to the second program step shown in FIG. 3 with the combination 60%, 20%, 350 mm for example, and executes further casting cycles 11 to 20 in accordance with program step 2 in column b in FIG. 4. The selection of predetermined parameters gives, for example, the eight possible variations shown in FIG. 3 of the individual parameters and, in accordance with the illustration in FIG. 4, these are executed automatically in succession by the optimization program in blocks a to n through in each case a predetermined number of casting cycles.

According to the illustration in FIGS. 3 and 4, it is thus possible to execute a very wide variety of combinations of individual parameters in succession without the die-casting machine coming to a halt. The desired number of casting cycles with its respective constant parameter data set is simply input into the optimization program. The desired parameters themselves are moreover fed to the machine by means of a data carrier. After these data have been input, the combination and storage of the possible parameters takes place automatically, the control system calculating and executing the necessary number of optimization programs itself.

The present invention is accordingly distinguished, first of all, by a fully automatic execution of predetermined parameter data sets by means of an optimization program without the machine coming to a halt in between. This can take the form, for example, of a sequence in accordance with the illustration in FIGS. 1 and 2 or in accordance with the illustration in FIGS. 3 and 4.

Once the casting cycles with the respective parameter data sets have been executed, automatic evaluation of these parts produced can take place. Various assessment criteria can be used for this in accordance with the illustration in FIG. 5, these criteria being given the letters A and B, for example. A first assessment criterion A can, for example, be the presence of shrinkage cavities in a particular region of the workpiece produced, while assessment criterion B is, for example, the surface finish. A suitable measuring method is used to perform the quality test and marks are awarded. For example, a measured part with severe shrinkage cavitation is given a poor mark, 1, while a part free from shrinkage cavities is given a very good mark, 10. The measuring method can select ranges within which the respective marks are awarded. A part awarded the mark 1 is in all cases a reject, while a part awarded the mark 10 meets all the requirements.

Figure 5:
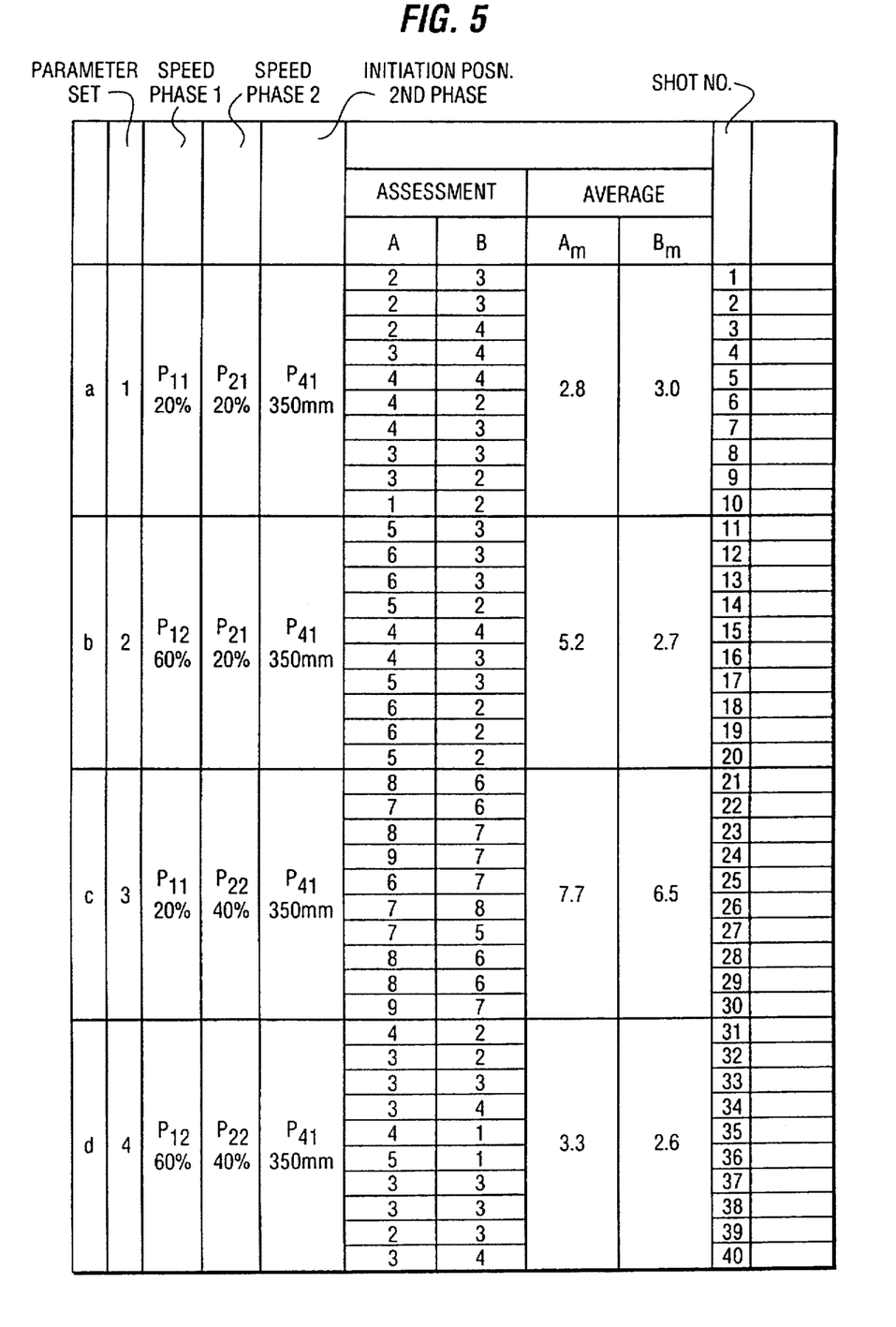
FIG. 5 shows an automatic assessment analysis of the parameter data sets executed, the data sets being shown in FIGS. 3 and 4.

In the topmost block a, FIG. 5 shows, by way of example, the first program step of the optimization program, the step shown in FIGS. 3 and 4, with the first parameter set 1 and the first parameter $p_{11}=20\%$, $p_{21}=20\%$ and the parameter $p_{41}=350$ mm. This parameter data set in block a was used in carrying out 10 casting cycles, 1 to 10, which are indicated in FIG. 5 by "Shot No.".

For assessment criterion A, e.g. the presence of shrinkage cavities, the first shot has been awarded the mark 2 and, with regard to the second assessment criterion B, the surface finish, has received the mark 3, the measured values obtained determining the marks given. As the illustration of the marks in block a clearly shows, these marks for casting cycles 1 to 10, for example those for assessment criterion A, fluctuate between the marks 1 and 4 and for assessment criterion B between the marks 2 and 4, even though the parameter data set 1 is identical in each case. From the automatically determined marks, the computer forms an average mark, which, in the case of parameter data set 1, leads to an average for assessment criterion A of 2.8 and for assessment criterion B of 3.0.

This scheme of assessment is followed for all the subsequent parameter data sets 2 to 8 of the illustrative embodiment shown in FIGS. 3 and 4, giving the average marks shown in the "average" column. The parameter data set 3 used in accordance with block c, for example, contains results of assessment for assessment criteria A and B which promise high quality and lead to the high average marks for A of 7.7 and for B of 6.5. From this it follows that such a data set, for example, results in a high quality of the parts produced and such a data set is thus used preferentially for series production.

The illustration in FIG. 5 furthermore illustrates the possibility of weighting the individual parameters, i.e. giving them less or greater significance in the evaluation depending on their relevance. If, for example, the selection of the first parameter of speed phase 1, $_{11}=20\%$, gives results which are of little worth in terms of the information they provide, less significance can be attributed to this parameter in the evaluation of the values determined and, in particular, in the evaluation and definition of permissible tolerance limits than, for example, to a parameter value which has a very significant effect on the quality of the product.

The evaluation of the results of measurement for the individual data sets is thus performed in accordance with known criteria for the quality of the parts produced, i.e. certain parameter data sets give good-quality parts while others result in poorer-quality parts.

Figure 6A:
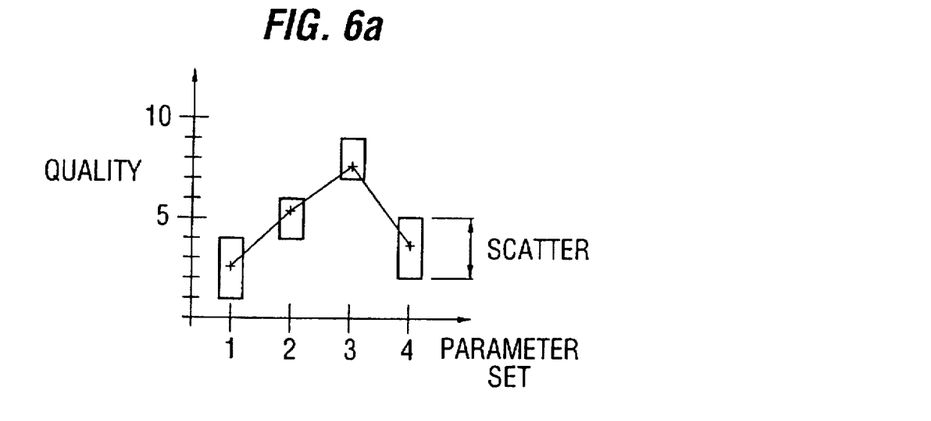
FIGS. 6a, 6b, and 6c shows graphic representations of the assessment results in accordance with FIG. 5.
Figure 6B:
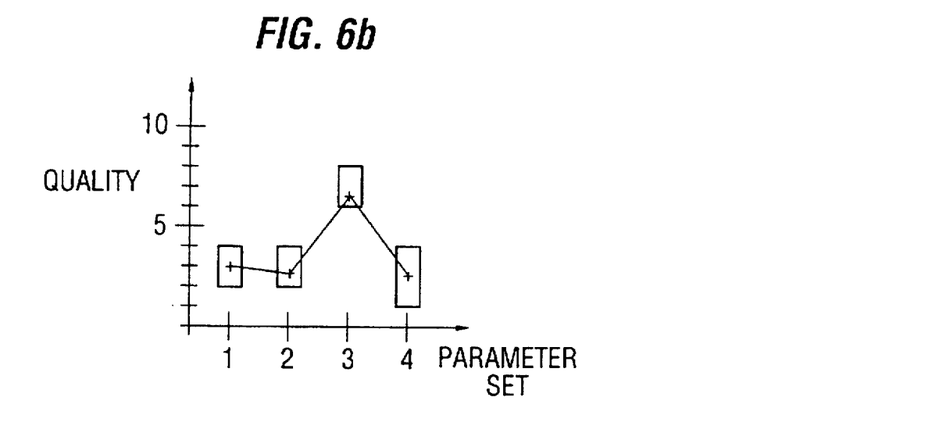
Figure 6C:
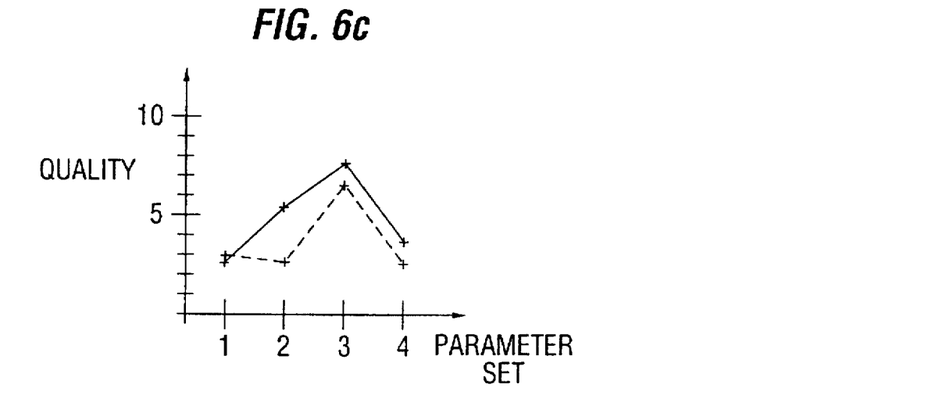

The average values obtained from FIG. 5 for the measured casting cycles or shot numbers for assessment criteria A and B can be represented graphically for the purpose of evaluation, as shown in FIGS. 6a to 6c. Here, FIG. 6a, for example, shows the assessment of quality criterion A, i.e. the presence of shrinkage cavities in the product. In this figure, the parameter data set used is shown on the X axis and the selected assessment grade on the Y axis. From this, it can be seen that the assessment criterion A for parameter data set 1 fluctuates between marks 1 and 4, with an average mark of $A_m=2.8$, while the assessment criterion A in the case of parameter data set 3 fluctuates between the values 7 and 9, with an average mark of 7.7. Accordingly, the graphical representation in FIG. 6a represents an expression of the quality and grade of the parameter data set measured. In this case, it is again found that parameter data set 3, with a narrow range of scatter between 7 and 9 and an average of 7.7, represents an optimum value for criterion A.

The same scheme is followed in FIG. 6b for assessment feature B, "surface finish". Here too, the third parameter set shown in FIG. 5 is found to represent a high quality level of the individual marks of between 5 and 8, giving an average for B, of 6.5. The other parameter data sets are significantly below this.

The average marks for assessment criteria A and B shown in a curve in FIGS. 6a and 6b are shown once more, together, in FIG. 6c, the upper curve representing quality feature A (shrinkage cavities) and the lower curve representing quality feature B (surface finish).

Thus, a large number of advantages are associated with the method described and in accordance with the invention for the automatic execution of parameter data sets by means of an optimization program on die-casting machines. In particular, the errors which arise, with manual input of the data, due to the stoppage of the die-casting machine each time are eliminated, making it possible to determine a maximum of reproducible data sets which give high quality in series production.

The invention is not restricted to the illustrative embodiments described and shown. On the contrary, they also include developments within the scope of the concept according to the invention.

What is claimed is:

1. A computer implemented method for determining optimized parameter values for a casting process for use with a die-casting machine, comprising:

storing a plurality of known data sets of individual parameters of a casting cycle for a casting process for an optimization program in a die data memory of a die-casting machine control system;

transferring automatically each data set of the plurality of known data sets in succession to the die-casting machine control from the die data memory by means of the optimization program, without external manual intervention, and running a preselected number of casting test cycles with each successive data set;

testing sample products produced with one data set in the casting test cycles for quality by metallurgical means to provide at least one measured value;

assessing quality of the sample products produced with one data set in the casting test cycles employing an automatic quality control operation to identify optimum parameter data sets from the at least one measured value; and using optimum parameter data sets for one series of measured values for the subsequent production of series-produced parts.

2. The computer implemented method as claimed in claim 1, wherein data sets ($D_1$ to $D_n$) each have a preselected number of individual parameters ($p_1$ to $p_7$), which are each executed for a certain preselected number of casting cycles in one program step (1 to n) of the optimization program.

3. The computer implemented method as claimed in claim 1, wherein data sets ($D_1$ to $D_n$) executed by means of the optimization program lead to sample products which, within a program run with a particular data set, are evaluated according to preselected physical assessment criteria (A, B) using known measuring methods, and wherein averages ($A_m$, $B_m$) determined in each program step with the particular data set give an indication of product quality level obtained with the particular data set.

4. The computer implemented method as claim in claim 3, wherein the preselected physical assessment criteria (A, B) are assessed on different scales of assessment depending on a weighting of respective individual parameters, parameters with a more significant effect being given a higher weighting and parameters with a less significant effect being given a lower weighting.

5. The computer implemented method as claimed in claim 1, wherein the evaluation of the sample products produced with a respective data set is performed by a known method of recording measured values for physical properties of the products, and wherein the quality of the measured values leads to a mark, the average of which for each physical assessment criterion is determined for each data set.

6. The computer implemented method as claimed in claim 1, wherein various influencing variables including speed in a Phase 1, speed in a Phase 2, and initiation position in a Phase 2 are available in different, graduated values which are in each case combined automatically in all combinations by the computer to give combined data sets of individual parameters, and wherein the optimization program executes each of these combined parameter data sets successively in a program step to determine optimum values without interrupting the casting process at the die-casting machine.

7. The computer implemented method as claimed in claim 1, wherein the automatic quality control operation of the sample products produced is performed by means of an automatic measuring arrangement for preselected measured values including shrinkage cavity formation, surface finish, and fracture tests.

8. The computer implemented method as claimed in claim 1, wherein, after assessing quality from the at least one measured value, quality-relevant tolerance zones for the individual parameters of the casting are defined.

* * * * *